United States Patent
Spruit et al.

(10) Patent No.: US 7,038,991 B1
(45) Date of Patent: May 2, 2006

(54) METHOD AND DEVICE FOR RECORDING INFORMATION IN UNITS

(75) Inventors: Johannes H. M. Spruit, Eindhoven (NL); Johannes J. L. M. Van Vlerken, Eindhoven (NL)

(73) Assignee: Koninklijke Philips Electronics, N.V., Eindhoven (NL)

( * ) Notice: Subject to any disclaimer, the term of this patent is extended or adjusted under 35 U.S.C. 154(b) by 0 days.

(21) Appl. No.: 09/546,971

(22) Filed: Apr. 11, 2000

(30) Foreign Application Priority Data

Apr. 16, 1999 (EP) ................... 99201185

(51) Int. Cl.
*G11B 7/00* (2006.01)

(52) U.S. Cl. .............. 369/59.24; 369/59.23; 369/59.25; 369/59.26; 369/275.3

(58) Field of Classification Search .......... 369/59.26, 369/59.24, 59.23, 47.3, 59.1, 47.24, 275.3, 369/275.1
See application file for complete search history.

(56) References Cited

U.S. PATENT DOCUMENTS

| 5,187,699 | A | * | 2/1993 | Raaymakers et al. .... 369/47.22 |
| 5,881,037 | A | * | 3/1999 | Tanaka et al. ........... 369/59.24 |
| 6,147,957 | A | * | 11/2000 | Nagara et al. ........... 369/59.11 |
| 6,208,603 | B1 | * | 3/2001 | Ishida et al. ............. 369/59.25 |
| 6,252,838 | B1 | * | 6/2001 | Kuroda et al. ........... 369/59.23 |

FOREIGN PATENT DOCUMENTS

WO     WO 9816014 A1 *  4/1998

* cited by examiner

*Primary Examiner*—Hoa T. Nguyen
*Assistant Examiner*—Jorge L. Ortiz-Criado

(57) ABSTRACT

A method and device for recording information in units on a partly recorded writable record carrier, e.g. an optical disc. The information is recorded in a track represented by series of marks of different runlengths between a minimum runlength and a maximum runlength and synchronizing patterns of marks, which patterns do not occur in the series of marks and comprise at least one long mark of at least the maximum runlength. At least one information unit is encoded into a modulated signal comprising signal elements corresponding to said marks. The track is scanned up to a link position before a selected one of said addressable locations, and the modulated signal is recorded from the link position. The modulated signal is provided at the begin and/or at the end with a link signal element corresponding to a mark of at most the minimum runlength.

26 Claims, 4 Drawing Sheets

Figure 3:
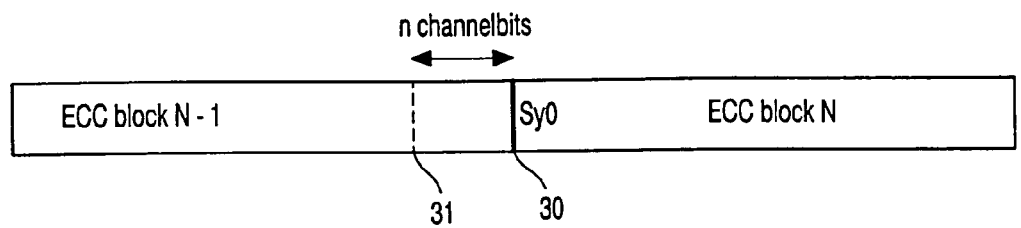

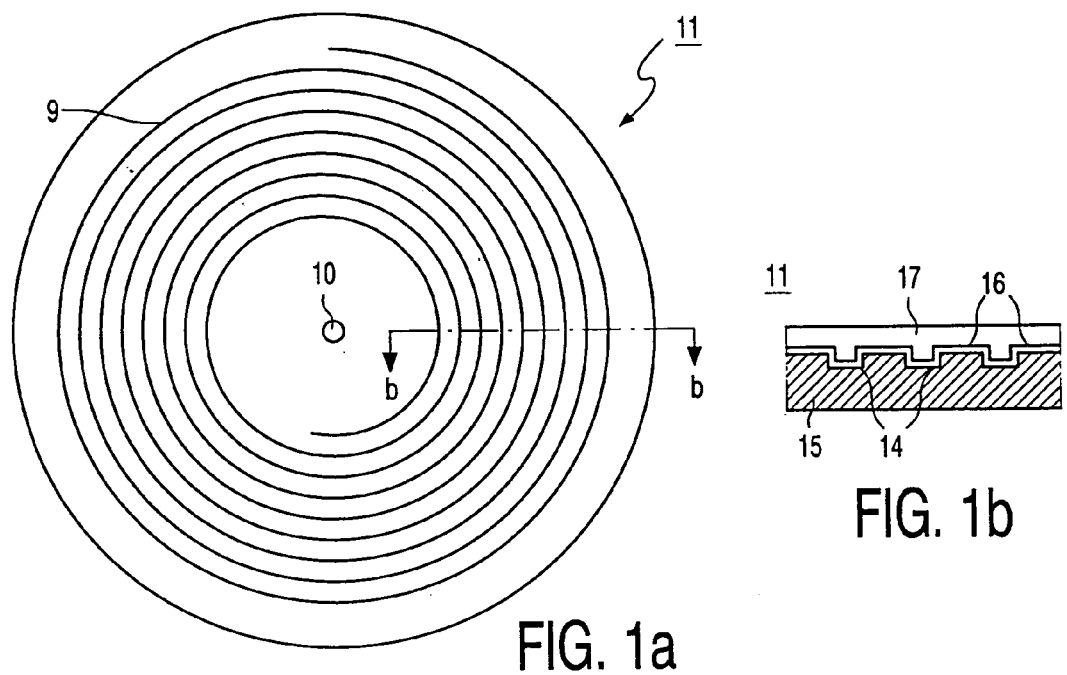
FIG. 1a
FIG. 1b
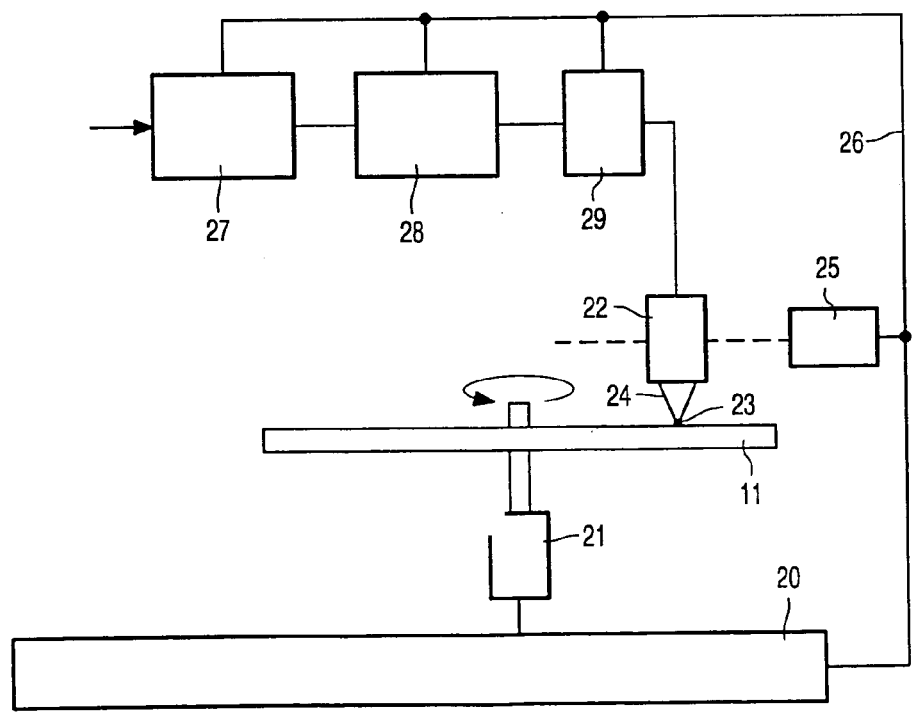
FIG. 2

METHOD AND DEVICE FOR RECORDING INFORMATION IN UNITS

The invention relates to a method of recording information in units on a record carrier having a track for consecutively recording the information units at addressable locations, the information being represented in the track by series of marks of different runlengths between a minimum runlength and a maximum runlength and synchronizing patterns of marks, which patterns do not occur in the series of marks and comprise at least one long mark of at least the maximum runlength, said method comprising encoding at least one information unit into a modulated signal comprising signal elements corresponding to said marks, scanning said track up to a link position before a selected one of said addressable locations, and recording the modulated signal from the link position.

The invention further relates to a device for recording information in units on a record carrier having a track for consecutively recording the information units at addressable locations, the information being represented in the track by series of marks of different runlengths between a minimum runlength and a maximum runlength and synchronizing patterns of marks, which patterns do not occur in the series of marks and comprise at least one long mark of at least the maximum runlength, said device comprising encoding means for encoding at least one information unit into a modulated signal comprising signal elements corresponding to said marks, and recording means for scanning said track up to a link position before a selected one of said addressable locations and recording the modulated signal from the link position.

A method and apparatus for successively recording information signals on a record carrier is known from U.S. Pat. No. 5,187,699. The information signal is modulated to a modulated signal having a frame structure comprising synchronizing signals for positioning the modulated signal in the track at predefined locations indicated by prerecorded track position information. The process of consecutively recording signals in adjacent areas in a track on the record carrier is called linking. In the known linking method, after a first recording signal is completely recorded, the recording process is continued after the last frame of the modulated signal up to a link position, which is the nominal boundary between signals recorded at different instants. When a next information signal is to be recorded, the recording process is started at the link position by recording dummy information (usually zero data) up to the start of the following predefined location. Hence the signal prior to the first frame synchronizing signal of said following location does not contain valid information. As a result a so called linking block is created between the first recorded signal and the second recorded signal, which linking block includes said link position. Hence the linking block does not contain valid recorded information, and its data storage capacity is lost.

It is an object of the invention to provide a recording method and device in which linking is more efficient.

For this purpose, the method as described in the opening paragraph is characterized in that the modulated signal is provided at the begin and/or at the end with a link signal element corresponding to a link mark of at most the minimum runlength. Further the device as described in the opening paragraph is characterized in that the encoding means are arranged for providing the modulated signal at the begin and/or at the end with a link signal element corresponding to a link mark of at most the minimum runlength. The link mark is the first element of the recording after the link position at the begin of the modulated signal, respectively the last element before the linking position at the end of the recording of the modulated signal. The record carrier may already have old marks recorded at an earlier instant in the track before the link position. The first element of the newly recorded signal may, in combination with an old mark recorded in the track just before the link position, form a concatenated mark which may have a total length of the sum of the lengths of the old mark and the link mark. The effect of the measure of the invention is, that because of the short runlength of the link mark, the occurrence of long concatenated marks is obviated. As such long marks might have been interpreted as the long mark in the synchronizing pattern, occurrence of false sync detection is reduced. Hence a valid synchronizing pattern in the newly recorded information shortly after the link position is reliably detectable. A similar effect occurs at the end of the newly recorded data. The mark recorded last may concatenate with an old mark after the link position and the concatenated mark might falsely be detected as a the long mark in a synchronizing pattern, disturbing the detection of the valid synchronizing pattern of a next information unit already recorded in the adjacent location immediately after the newly recorded location. Using the link mark at the end of writing obviates the occurrence of long concatenated marks, and therefore reduces false sync detection.

The invention is also based on the following recognition. Usual channel coding and decoding systems are arranged to operate on symbols (e.g. 8 or 16 channel bits). At the link position, there will usually be a shift of the symbol boundary, a so called bit slip of a few bits, because it is hardly possible to start the recording process with an accuracy of less than one bit. When during decoding a read signal from the link position is decoded, the decoder will detect errors in all symbols up to the next valid synchronizing signal. In the prior art systems at the link position a false synchronizing pattern might be detected, because of said long concatenated marks. Such false detection might disturb the detection of the next valid synchronizing pattern, because after detection of a synchronizing signal the decoding system may not accept a further synchronizing signal at a short distance. Hence a long area, called linking block, had to be reserved for linking, which linking block did not contain useful data. However the inventors have seen, that by preventing false detection of synchronizing patterns the unusable storage area due to linking can be limited. Any next valid synchronizing signal can be detected reliably, because there is substantially no risk that the synchronizing detector locks on a false synchronizing pattern. Hence only a short area around the link position may contain errors and needs to be reserved.

A preferred embodiment of the device according to claim 4 has the advantage, that the link mark may in worst case, when concatenated to a maximum runlength mark, forms a concatenated mark which has a predetermined maximum length. In particular this is advantageous, if the long mark in the synchronizing pattern is selected to be longer than said predetermined maximum length.

Further advantageous, preferred embodiments according to the invention are given in the further dependent claims.

Figure 4:
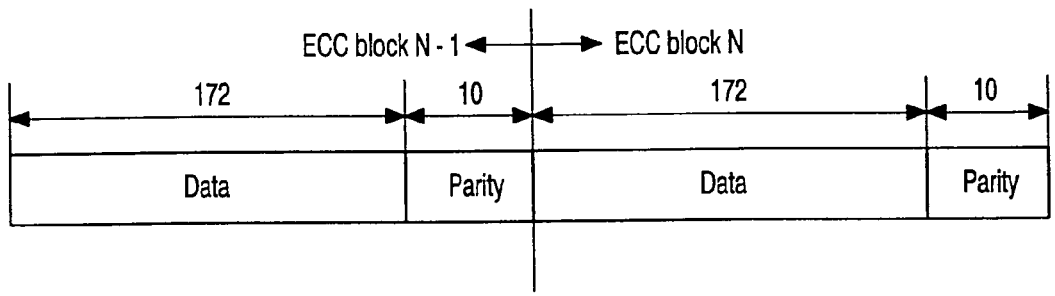
Figure 5:
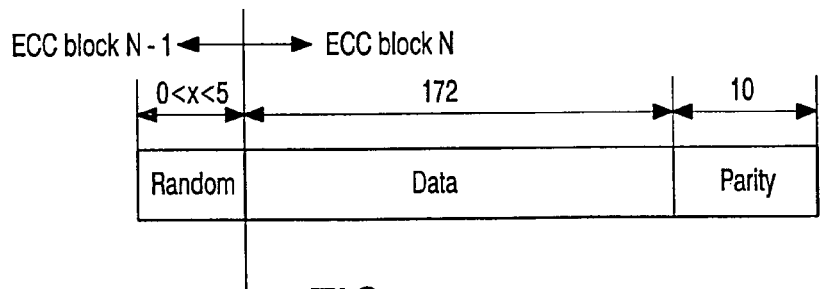
Figure 6:
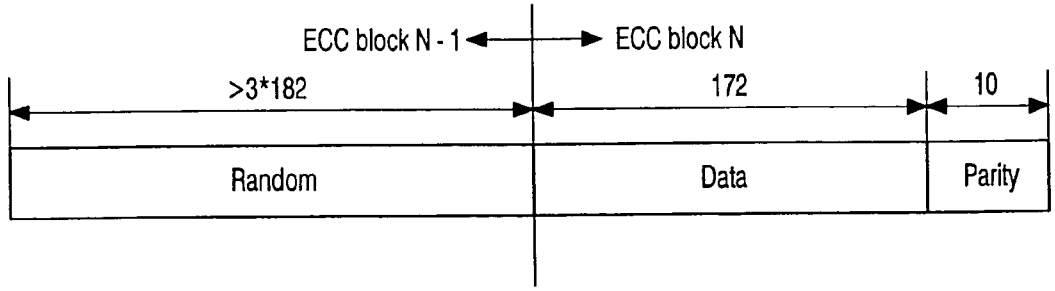
Figure 7:
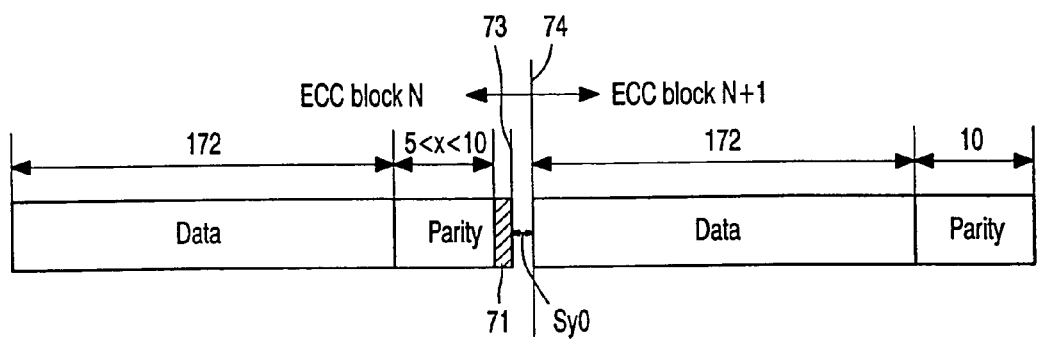
Figure 8:
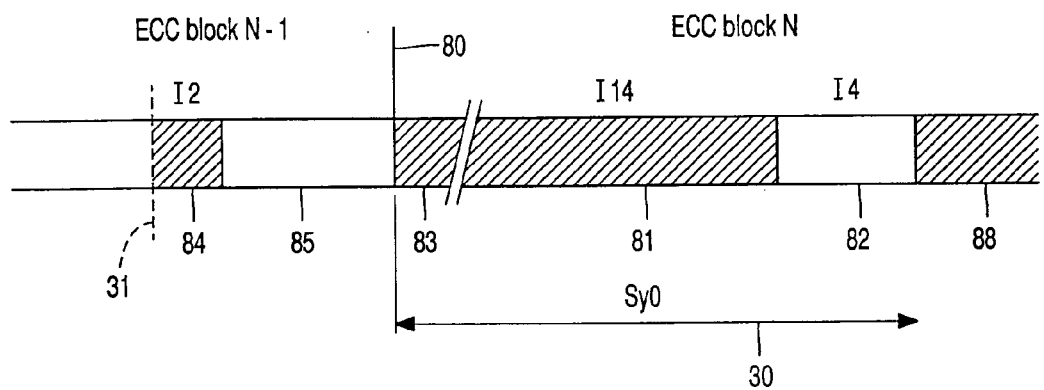
Figure 9:
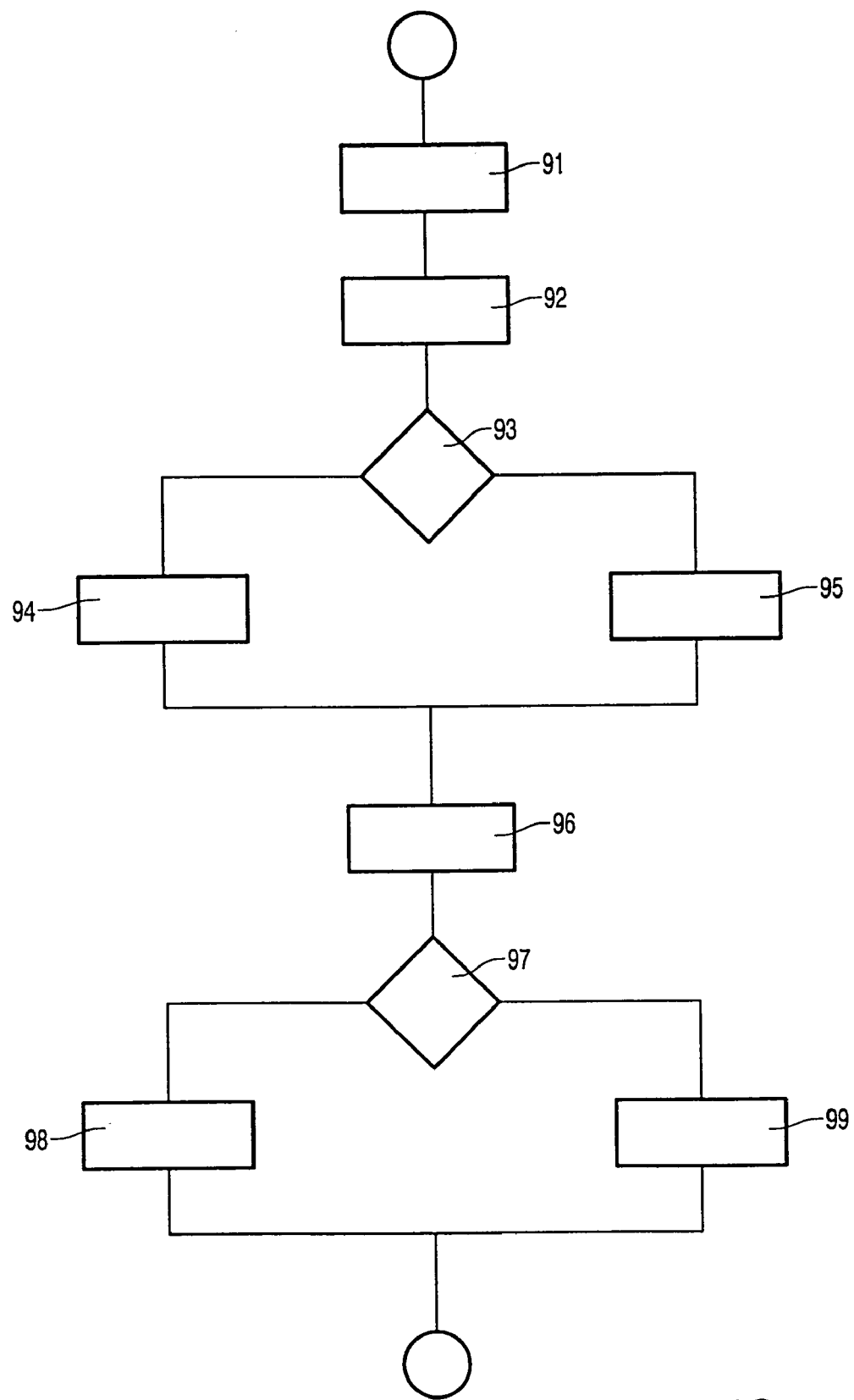

These and other aspects of the invention will be apparent from and elucidated further with reference to the embodiments described by way of example in the following description and with reference to the accompanying drawings, in which FIG. 1 shows a record carrier, FIG. 2 shows a recording device, FIG. 3 shows the link position due to recording block N after block N−1, FIG. 4 shows consecutive frames for continuous recording FIG. 5 shows the link position for recording block N after a recorded location, FIG. 6 shows the start position for recording block N after an unrecorded location, FIG. 7 shows the end link position for recording block N before a recorded location, FIG. 8 shows a short link mark at a link position, and FIG. 9 shows a recording method for successively recording information signals.

Corresponding elements in different Figures have identical reference numerals.

FIG. 1a shows a disc-shaped record carrier 11 having a track 9 and a central hole 10. The track 9 is arranged in accordance with a spiral pattern of turns constituting substantially parallel tracks on an information layer. The record carrier may be optically readable, called an optical disc, and has an information layer of a recordable type. Examples of a recordable disc are the CD-R and CD-RW, and writable versions of DVD, such as DVD+RW. The information is represented on the information layer by recording optically detectable marks along the track, e.g. crystalline or amorphous marks in phase change material. The track 9 on the recordable type of record carrier is indicated by a pre-embossed track structure provided during manufacture of the blank record carrier. The track structure is constituted, for example, by a pregroove 14 which enables a read/write head to follow the track during scanning. The track structure comprises position information, e.g. addresses, for indication the location of units of information, usually called blocks. The position information may include specific synchronizing marks for locating the start of such units.

FIG. 1b is a cross-section taken along the line b—b of the record carrier 11 of the recordable type, in which a transparent substrate 15 is provided with a recording layer 16 and a protective layer 17. The pregroove 14 may be implemented as an indentation or an elevation, or as a material property deviating from its surroundings.

The record carrier 11 is intended for carrying information represented by modulated signals comprising frames. A frame is a predefined amount of data preceded by a synchronizing signal. Usually such frames also comprise error correction codes, e.g. parity words. An example of such a recording system is known from the DVD system, in which the frames carry 172 data words and 10 parity words, which example is used in the description below. The data is organized in units comprising a number of frames which contain Error Correction Codes (ECC) for correcting errors in the user information in the unit. In DVD the size of such a unit is 32 KB user data, and contains 2 layers of error correction, and is called a block. The first layer of error correction (called C1) corrects small errors like random errors, and the second layer (called C2) corrects the large error such as burst errors. A drive should be able to write and/or rewrite such a block independently. According to the invention no blocks are needed for linking only, all blocks can be used to store user data. This means that a link position should be defined in order to guarantee data integrity. There will always be some errors on a link position but the goal is to minimize the amount of errors on such a link position. The following items are important for the choice of the link position:

The accuracy of the writing (in channel bits) which can be achieved with respect to the data already written on the disc.

The effect of a few bit errors on the error correction.

The content of the data written on the link position.

The physical damage caused by overwriting each time the same data.

A main consideration is, that if a bitslip occurs in combination with data, which is protected with error correction, then the position of the bitslip is very important. For DVD the data is divided in to ECC units of 32 KB, while the error correction operates on channel words or bytes. If (e.g. after the linking point) the word boundary is shifted one or a few bits, all words are different, and no error correction can take place. This is called bitslip. A C1 code word means one row of the error correction and is able to detect and correct errors. A bitslip at the beginning of a C1 code word will destroy all the bytes after the bitslip. The error correction capability is limited and the result is that the whole C1 code word is not correctable. Now the second layer (C2) is required to correct the errors. When the bitslip occurs at the end of a C1 code word then the amount of errors is limited and the error correction will be able to correct the errors. The second layer of error correction is not required for the correction of errors and can be used for other errors. So a link position is preferable position at the end of the last C1 code word of the previous ECC unit.

FIG. 3 shows the link position due to recording block N after block N−1. The link position 31 is indicated by a dashed line at 'n' channel bits before the synchronizing signal 30, in the DVD format called Sy0. For DVD the first error correction layer consists of 172 data bytes and 10 parity bytes. With 10 parity bytes maximum 5 byte errors can be corrected, but a more practical limit is less or equal to 4 byte errors. The result of this insight is to position the linking of ECC block N−1 and ECC block N after the last 4 bytes of ECC block N−1 and before the start of block N. For n=32 the position shown corresponds to 2 bytes (as one byte has 16 channel bits in DVD), which gives the maximum tolerance for link position inaccuracies. In general the link position may be selected as close as possible before the synchronization signal, while making sure that despite the start of write link position inaccuracies in forward direction the new information always overwrites the old synchronization signal. Correspondingly, at the end of write before an already existing information unit, the new information should never damage the next synchronization signal of said already existing information unit. The last channel words of an information unit usually represent parity symbols (called parity bytes above), and hence the minimal number of parity symbols is damaged. In an embodiment the linking errors can be limited to errors within one symbol, when the total range of link position inaccuracies in forward and backward direction is smaller than one channel word. The link position is then set within the last channel word before the synchronizing signal, taking into account the maximal forward and backward inaccuracies. A practical value for such a link position is the middle of the last channel word, when a symmetrical pattern of forward and backward link position inaccuracies is expected. For a channel word of 16 channel bits this amounts to 8 channel bits before the end of the information unit.

FIG. 2 shows a recording device for writing information on a record carrier 11 of a type which is (re)writable. The device is provided with recording means for scanning the track on the record carrier including drive means 21 for rotating the record carrier 11, a head 22, positioning means 25 for coarsely positioning the head 22 in the radial direction on the track, and a control unit 20. The head 22 comprises an optical system of a known type for generating a radiation beam 24 guided through optical elements focused to a radiation spot 23 on a track of the information layer of the record carrier. The radiation beam 24 is generated by a radiation source, e.g. a laser diode. The head further comprises a focusing actuator for moving the focus of the radiation beam 24 along the optical axis of said beam and a tracking actuator for fine positioning of the spot 23 in a radial direction on the center of the track. The tracking actuator may comprise coils for radially moving an optical element or may be arranged for changing the angle of a reflecting element. For writing information the radiation is controlled to create optically detectable marks in the recording layer. For reading the radiation reflected by the information layer is detected by a detector of a usual type, e.g. a four-quadrant diode, in the head 22 for generating a read signal and further detector signals including a tracking error and a focusing error signal coupled to said tracking and focusing actuators. The read signal is processed by a reading means of a usual type (not shown) to retrieve the information. The device comprises means for processing the input information to generate a write signal to drive the head 22, which comprise an input unit 27, a formatting unit 28, and a modulation unit 29. The control unit 20 controls the recording and retrieving of information and may be arranged for receiving commands from a user or from a host computer. The control unit 20 is connected via control lines 26, e.g. a system bus, to said means and to the drive means 21, and the positioning means 25. The control unit 20 comprises control circuitry, for example a microprocessor, a program memory and control gates, for performing the procedures and functions according to the invention as described below with reference to FIG. 3. The control unit 20 may also be implemented as a state machine in logic circuits. During the writing operation, marks representing the information are formed on the record carrier. The marks may be in any optically readable form, e.g. in the form of areas with a reflection coefficient different from their surroundings, obtained when recording in materials such as dye, alloy or phase change material, or in the form of areas with a direction of magnetization different from their surroundings, obtained when recording in magneto-optical material. Writing and reading of information for recording on optical disks and usable formatting, error correcting and channel coding rules are well-known in the art, e.g. from the CD system. The marks can be formed by means of the spot 23 generated on the recording layer via the beam 24 of electromagnetic radiation, usually from a laser diode. User information is presented on the input unit 27, which may comprise of compression means for input signals such as analog audio and/or video, or digital uncompressed audio/video. Suitable compression means are described for audio in WO 98/16014-A1 (PHN 16452) and for video in the MPEG2 standard. The input unit 27 processes the audio and/or video to unit of information, which are passed to the formatting unit 28 for adding control data and formatting the data according to the recording format, e.g. by adding error correction codes (ECC). For computer applications units of information may be interfaced to the formatting unit 28 directly. The formatted data from the output of the formatting unit 28 is passed to the modulation unit 29, which comprises for example a channel coder, for generating a modulated signal which drives the head 22. Further the modulation unit 29 comprises synchronizing means for including synchronizing patterns in the modulated signal. The formatted units presented to the input of the modulation unit 29 comprise address information and are written to corresponding addressable locations on the record carrier under the control of control unit 20. Usually the recording apparatus will also be arranged for reading having the reading and decoding means of a playback apparatus and a combined write/read head.

According to the invention the control unit 20 of the recording device as shown in FIG. 2 is arranged for recording the information according to the methods described below with reference to the FIGS. 4 to 8. The modes of writing are defined for different situations. The start/stop or continuous writing modes are defined separately; four different writing modes are defined: Continuous writing, Start of writing when the previous location is already written, Start of writing when the previous location is erased or not written, and End of writing.

FIG. 4 shows consecutive frames for continuous recording. No special action is required. The recorder continually records from block N−1 to block N without special action.

FIG. 5 shows the link position for recording block N after a recorded location. The link position is selected at a predefined distance before the first synchronizing signal of the new frame. The predefined distance is relatively short (at least in the second half of the frame), but actually much closer to the end, so as to minimize the number of errors. For recording DVD the link position may be positioned after byte 178 of the last C1 code word of the previous ECC unit and before the start of the next ECC unit, i.e. the synchronizing signal Sy0. In an embodiment the data to be written before the new data start is chosen random, which is important for the interaction between old and new data for phase change recording. Writing each time exactly the same data over each other limits the amount of overwrite cycles. Therefore the following measures separate or in combination may be included:

The data in the linking area can be chosen random. This will prevent overwriting each time the same data in the linking area. An advantage of using random data is important when the new ECC unit contains always exactly the same data. The random data will cause always of different start value of the Digital Sum Value (DSV) at the beginning of the new ECC unit. The different values of the DSV cause differences in the following signal even when the data is not changed, and this improves the number of overwrite cycles of the data.

A small random shift of the link position can be introduced to improve the direct overwrite cycles.

In FIG. 5 a distance x in error symbols (0<x<5) is indicated for the linking distance. As discussed above the distance x must be shorter than the number of error symbols which can be corrected. Of course the actual distance may have any value in channel bits, which results in said number of correctable symbols, as long as the spread in this distance due to linking inaccuracies does not damage the next synchronization signal Sy0. It may be acceptable that in some cases even the beginning of the Sy0 synchronizing pattern is damaged, as long as the special mark (or marks) within the synchronizing pattern, e.g. a long mark I14 of runlength 14 channel bits, is not damaged, because such special marks are used for detecting the synchronizing patterns.

FIG. 6 shows the start position for recording block N after an unrecorded location. When no data is written on the disc at the position of the previous ECC block then the recording should start at least a few hundred channel bits before the new ECC block starts. But the longer the better because the channel electronics (e.g. a PLL/Slicer/Sync detection) needs time to adjust and synchronize. When at least 3 three sync frames are recorded then the flywheel construction of the sync is already working. In this case random data is written, but the sync patterns are of course embedded in the proper positions.

FIG. 8 shows a short link mark at a link position. A schematic drawing of marks around the boundary 80 between two locations 'ECC block N−1' and 'ECC block N' is drawn. The synchronizing pattern 30 (Sy0, total length 32 channel bits) comprises a long I14 mark 81 with a runlength of 14 channel bits, followed by a short I4 mark 82 of 4 channel bits, and preceded by some short marks 83 (not fully shown), which synchronizing pattern is used in DVD. After Sy0 the normal data represented by series of marks 88 follows, in which marks I3 have the minimum runlength 3, and marks I11 have the maximum runlength 11. Hence the synchronizing pattern 30 cannot occur in the normal data and long mark 81 is easily recognized as synchronizing mark. The link position 31 is selected at 8 channel bits before the boundary 80, as described above with reference to FIG. 3. The first mark after the link position 31 is a link mark 84, which has a runlength of 2 channel bits, i.e. shorter than the shortest mark in the normal data series of marks 88. The area between the link position 31 and the synchronizing pattern 30 is filled by a linking sequence, which has the link mark 84 as its first mark and a further pattern of marks 85. The link mark 84 may have the same polarity as existing marks of block N−1, but the maximum runlength of the resulting concatenated mark is as short as possible. Hence the occurrence of false synchronizing marks is minimized.

In an embodiment the link mark is shorter than the difference between the synchronizing mark and the longest mark. The synchronizing mark may be set to a long runlength, e.g. I17, and for a longest normal mark of size I11, the link mark sizes I3, I4 and I5 may be used. However, to prevent errors by concatenated marks or consecutive marks with a short, undetectable interruption, the shorter link marks are preferred. In FIG. 8 the link mark has length I2, which is one channel bit shorter than the shortest mark in the normal data, and also shorter than the difference between the longest mark I11 and the long synchronizing mark 81 with length I14, i.e. I14−I11=3.

As described with reference to FIG. 5 the signals written at a same location are not the same each time. In an embodiment the linking sequence may be fixed but with a random polarity, or the further pattern may be generated at random (within the runlength constraints for normal data). In an embodiment the linking sequence may be randomly or sequentially selected from a limited set of linking sequences that each start with a link mark followed by a predefined but differing number of mark boundaries. It is to be noted that the link mark now always has the same polarity, e.g. formed by write level laser power, and that following number of mark boundaries results in a random start level of the normal data. Commonly sequences of marks are indicated by binary strings, a 'one' indicating a mark boundary and a 'zero' indicating no change. Suitable sets of sequences for a link position at 8 channel bits are: 10100000 (resulting in the marks shown in FIG. 8) and 10100100 when starting with an I2 mark, and 10010000 and 10010010 when starting with an I3 mark. Each time a unit is recorded one of the linking sequences is selected, e.g. alternating. For such sets substantially half of the linking sequences of the set should have an odd number of mark boundaries, to achieve a random polarity of the signal at the start of Sy0.

In an embodiment for DVD the mark following the link mark has a length differing of 4, whereas in the synchronizing pattern the long mark 81 is followed by the I4 mark. In general in the linking sequences the second mark preferably is of a different length than the mark following the long mark 81 in the synchronizing pattern. This further reduces the occurrence of false synchronizing, when synchronizing detectors are arranged for detecting the combination of the long mark and a second mark of the synchronizing pattern. In a further embodiment the synchronizing pattern comprises a combination of marks which does not occur in the normal data series of marks, e.g. two consecutive marks of the maximum runlength. The linking sequence now starts with the short link mark, followed by at least a further short mark. Hence the occurrence of false synchronizing patterns is minimized. In the embodiments of a recording device the length and pattern of synchronizing marks and the linking sequence are selected to minimize or preferably exclude the occurrence of false synchronizing patterns.

The above marks are recorded in the track according to known recording methods by driving a write head by a modulated signal that has signal elements corresponding to the marks, as described with reference to FIG. 2. For example a signal element may be a pulse or a sequence of very short pulses.

FIG. 7 shows the end link position for recording block N before a recorded location. The next block N+1 starts with a synchronizing signal 74. The end link position 73 at which the writing process is stopped is preferable as short as possible before the position of the next ECC block, because then the error correction has the minimum number of errors to correct. The end link position may be set at the same link distance as the start link position, but alternatively a different distance may be selected, e.g. a somewhat closer to synchronizing signal 74 to prevent unrecorded areas, which might be mistaken for synchronizing marks. The remaining number of undamaged parity symbols x is indicated to be between 5 and 10 for example for DVD, indicating that at least half the available number is undamaged. The information is represented by marks of different runlengths. Advantageously the last mark 71 before the end link position 73, called link mark, is a short mark of a runlength at most as long as the minimum runlength in the rest of the ECC block. The link mark is followed by intermediate area 72 up to the first synchronizing mark of the ECC block N+1, which intermediate area usually comprises old marks of previous block N. After the last (completely written) parity symbol, e.g. x=9, the link mark may be added immediately. Alternatively, first one or more intermediate marks may be added before the link mark, resulting in a link pattern up to the link position. The link pattern may be selected according to encoding rules required by the preceding symbols, e.g. in the channel encoding rules of DVD some bit positions in a channel word are required for decoding the preceding code word via a so called coding state. Hence the corresponding bit positions in the link pattern must be according to the required coding state, and the last undamaged parity symbol may be decoded unambiguously. In an embodiment the last mark has a runlength shorter than said minimum runlength. The short link mark 71 may be of the same polarity as the old marks and concatenate with one of them, but the maximum runlength of the resulting concatenated mark is as short as possible. Hence the occurrence of false synchronizing marks is minimized. In an embodiment additional measures are taken to achieve the short link mark, e.g. runlength I2 or I3, at the end of writing. Usually (in phase change recording) after writing a mark by a writing laser power level the laser is switched to erasing power to create the next mark, i.e. an erased area of the required runlength. However, because of the substantially circular shape of the spot 23 on the recording layer, the last part of the preceding written mark is also erased, resulting in a concave, roughly moon shaped, ending of the preceding mark. Hence, when the writing is stopped after the link mark, and consequently the laser is switched off or at most to reading power, no erasing effect of said last part occurs, and the link mark tends to be longer than intended. To compensate this prolonging effect, a shorter (e.g. I2) link mark may be used at stopping, whereas a somewhat longer (e.g. I3) link mark may be used at the start of write. Alternatively, a dedicated write pulse sequence may be used for the stopping link mark, e.g. using the normal I2 pulse followed by a very short erasing pulse.

FIG. 9 shows a recording method for successively recording information signals. It is assumed that a record carrier of a writable type is inserted in a recording device and that it already contains some recorded information. In a first step 91 (COMMAND) a command is received to record block N. In a second step 92 (SCAN) the track on the record carrier is scanned up to the preceding location of block N−1. In a first test 93 it is decided, if the preceding location is not blank (i.e. contains already some information signal). If NOT BLANK, in a step 95 a start position is determined at a first predetermined distance as described above with reference to FIG. 5. If no information signal is present on the preceding location, in a step 94 a long sequence of dummy data is recorded before the start of location N to enable any read circuit to lock to the data as described with reference to FIG. 6. In step 96 after said steps 94 or 95 the actual block N (or several continuous blocks as described with reference to FIG. 4) are recorded. In test 97 the status of the location N+1 after block N is determined. This may be accomplished by scanning the track before the recording is started, e.g. in step 92. Alternatively a special table may be present on the record carrier or in the device which keeps track of unrecorded and recorded areas, e.g. in the file management system. In the event that no signal is recorded after block N (or the signal has no valid status, e.g. erased), in a step the recording process is continued at least until the modulated signal of block N is completely recorded, and it may be continued for some predetermined distance after the last frame to prevent any read circuit from detecting a read error prematurely. In the event that the next location N+1 contains a valid information signal, in a step 99 the recording process is stopped at a second predetermined distance before the modulated signal of block N is completely recorded as described with reference to FIG. 7. After steps 98 or 99 the recording of block N is completed, and a next command may be awaited.

In an embodiment the test 97 is omitted and the recording process is always stopped at a short predetermined distance before the nominal position of the start of the synchronizing signal of the next block. In addition the above embodiments may be arranged to select the second predetermined distance always shorter than the first predetermined distance. This has the advantageous effect, that no unrecorded gaps will exist between successively recorded blocks. It is to be noted that starting and ending point inaccuracies must be taken into account.

Although the invention has been explained by embodiments using the DVD-optical recording format, it may be applied for any format for recording units of information. For example the record carrier may also be a magnetic type disc or a tape. It is noted, that in this document the word 'comprising' does not exclude the presence of other elements or steps than those listed and the word 'a' or 'an' preceding an element does not exclude the presence of a plurality of such elements, that any reference signs do not limit the scope of the claims, that the invention may be implemented by means of both hardware and software, and that several 'means' may be represented by the same item of hardware. Further, the scope of the invention is not limited to the embodiments, and the invention lies in each and every novel feature or combination of features described above.

The invention claimed is:

1. Method of recording information in units on a record carrier having a track for consecutively recording the information units at addressable locations, the information being represented in the track by series of marks of different runlengths between a minimum runlength and a maximum runlength and synchronizing patterns of marks, which patterns do not occur in the series of marks and comprise at least one long mark of at least the maximum runlength, said method comprising:
   (a) encoding at least one information unit into a modulated signal comprising signal elements corresponding to said marks,
   (b) scanning said track up to a link position before a selected one of said addressable locations, and
   (c) recording the modulated signal from the link position,
   (d) the modulated signal is provided at the begin and/or at the end with a link signal element corresponding to a link mark of at most the minimum runlength.

2. Method of recording information in units on a record carrier having a track for consecutively recording the information units at addressable locations, the information being represented in the track by series of marks of different runlengths between a minimum runlength and a maximum runlength and synchronizing patterns of marks, which patterns do not occur in the series of marks and comprise at least one long mark of at least the maximum runlength, said method comprising:
   (a) encoding at least one information unit into a modulated signal comprising signal elements corresponding to said marks,
   (b) scanning said track up to a link position before a selected one of said addressable locations, and
   (c) recording the modulated signal from the link position,
   (d) the modulated signal is provided at the begin and/or at the end with a link signal element corresponding to a link mark of at most the minimum runlength,
wherein the link signal element corresponds to a mark shorter than the minimum runlength.

3. Device for recording information in units on a record carrier having a track for consecutively recording the information units at addressable locations, the information being represented in the track by series of marks of different runlengths between a minimum runlength and a maximum runlength and synchronizing patterns of marks, which patterns do not occur in the series of marks and comprise at least one long mark of at least the maximum runlength, said device comprising
   encoding means for encoding at least one information unit into a modulated signal comprising signal elements corresponding to said marks, and
   recording means for scanning said track up to a link position before a selected one of said addressable locations and recording the modulated signal from the link position, the encoding means are arranged for providing the modulated signal at the begin and/or at the end with a link signal element corresponding to a link mark of at most the minimum runlength.

4. Device for recording information in units on a record carrier having a track for consecutively recording the information units at addressable locations, the information being represented in the track by series of marks of different runlengths between a minimum runlength and a maximum runlength and synchronizing patterns of marks, which patterns do not occur in the series of marks and comprise at least one long mark of at least the maximum runlength, said device comprising encoding means for encoding at least one information unit into a modulated signal comprising signal elements corresponding to said marks, and recording means for scanning said track up to a link position before a selected one of said addressable locations and recording the modulated signal from the link position, the encoding means are arranged for providing the modulated signal at the begin and/or at the end with a link signal element corresponding to a link mark of at most the minimum runlength, wherein said runlengths are expressed in steps of a channel bit, and the encoding means are arranged for providing the link signal element corresponding to a link mark one channel bit shorter than the minimum runlength.

5. Device as claimed in claim 4, wherein the encoding means comprise synchronizing means for providing said at least one long mark in the synchronizing pattern at a runlength longer than the sum of the maximum runlength and the runlength of the link mark.

6. Device as claimed in claim 3, wherein the encoding means comprise synchronizing means for providing said at least one long mark in the synchronizing pattern at a runlength longer than the sum of the maximum runlength and the runlength of the link mark.

7. Device for recording information in units on a record carrier having a track for consecutively recording the information units at addressable locations, the information being represented in the track by series of marks of different runlengths between a minimum runlength and a maximum runlength and synchronizing patterns of marks, which patterns do not occur in the series of marks and comprise at least one long mark of at least the maximum runlength said device comprising encoding means for encoding at least one information unit into a modulated signal comprising signal elements corresponding to said marks, and recording means for scanning said track up to a link position before a selected one of said addressable locations and recording the modulated signal from the link position, the encoding means are arranged for providing the modulated signal at the begin and/or at the end with a link signal element corresponding to a link mark of at most the minimum runlength, wherein the encoding means comprise synchronizing means for providing the synchronizing pattern having said at least one long mark followed by a short mark of a runlength shorter than the maximum runlength, and the encoding means are arranged for providing a second link signal element after the link signal element at the begin of the modulated signal, the second link signal element corresponding to a mark differing from the short mark.

8. Device as claimed in claim 3, wherein the encoding means comprise means for variably selecting one out of a set of fixed linking sequences that each start with the link signal element followed by further signal elements for recording marks up to a first synchronizing pattern, substantially half of the linking sequences of the set having an odd number of mark boundaries.

9. Device for recording information in units on a record carrier having a track for consecutively recording the information units at addressable locations, the information being represented in the track by series of marks of different runlengths between a minimum runlength and a maximum runlength and synchronizing patterns of marks, which patterns do not occur in the series of marks and comprise at least one long mark of at least the maximum runlength, said device comprising encoding means for encoding at least one information unit into a modulated signal comprising signal elements corresponding to said marks, and recording means for scanning said track up to a link position before a selected one of said addressable locations and recording the modulated signal from the link position, the encoding means are arranged for providing the modulated signal at the begin and/or at the end with a link signal element corresponding to a link mark of at most the minimum runlength, wherein the encoding means comprise means for variably selecting one out of a set of fixed linking sequences that each start with the link signal element followed by further signal elements for recording marks up to a first synchronizing pattern, substantially half of the linking sequences of the set having an odd number of mark boundaries, wherein the linking sequences have a fixed length of 8 channel bits, and the set of fixed linking sequences comprises 10100000 and 10100100, or 10010000 and 10010010, each 1 indicating a mark boundary.

10. Device as claimed in claim 3, wherein the device comprises means compressing digital or analog input signals into units of information.

11. The device of claim 10, wherein the input signals are audio and/or video signals.

12. A record carrier produced by the method of claim 1.

13. A method comprising:

encoding an information unit;

forming a recording signal of signal elements, the recording signal containing: a linking signal element, a synchronizing pattern of signal elements, and the encoded information unit;

selecting an addressable location on the track of a record carrier;

scanning the track up to a link position before the selected addressable location; and recording the recording signal as marks corresponding to the signal elements and starting at the link position, the marks having different run lengths, the marks representing the information unit having run lengths that vary from a minimum run length to a maximum run length, the pattern of marks representing the synchronizing pattern not occurring in the marks representing the information unit and including a long mark of at least the maximum runlength, the mark representing the link signal element having a run length of at most the minimum runlength.

14. A recording device comprising:
encoding means for encoding at least one information unit, and for variably selecting one out of a set of fixed linking sequences that each start with a link signal element followed by further signal elements, and for providing a recording signal of signal elements, the recording signal containing the selected linking sequence, a synchronizing pattern, and the encoded information unit; and
recording means for selecting an addressable location in the track of a record carrier, and for scanning said track up to a link position before the selected addressable location and for recording the recording signal starting at the link position, the marks having different run lengths, the marks representing the information unit having run lengths that vary from a minimum run length to a maximum runlength, the pattern of marks representing the synchronizing pattern not occurring in the marks representing the information unit and including a long mark of at least the maximum runlength, the mark representing the link signal element having a run length of at most the minimum runlength.

15. Method of recording information in units on a record carrier having a track for consecutively recording the information units at addressable locations, the information being represented in the track by series of marks of different runlengths between a minimum runlength and a maximum runlength and synchronizing patterns of marks, which patterns do not occur in the series of marks and comprise at least one long mark of at least the maximum runlength, said method comprising:
(a) encoding at least one information unit into a modulated signal comprising signal elements corresponding to said marks,
(b) scanning said track up to a link position before a selected one of said addressable locations, and
(c) recording the modulated signal from the link position,
(d) the modulated signal is provided at the begin and/or at the end with a link signal element corresponding to a link mark of at most the minimum runlength,
wherein:
the runlengths are expressed in steps of a channel bit, and the link signal element is one channel bit shorter than the minimum runlength;
the at least one long element in the synchronizing pattern has a runlength longer than the sum of the maximum runlength and the runlength of the link element;
in the synchronizing pattern the at least one long element is followed by a short element of a runlength shorter than the maximum runlength;
the recording signal includes a first link signal element at the beginning of the recording signal and a second link signal element immediately following the first link signal element, the second link signal element having a different runlength then the first link signal element;
the method further comprises variably selecting one out of a set of fixed linking sequences that each start with the link signal element followed by further signal elements, the further signal elements being immediately followed by a first synchronizing pattern, and substantially half of the linking sequences of the set having an odd number of element boundaries;
the linking sequences have a fixed length of 8 channel bits, and the set of fixed linking sequences including 10100000 and 10100100, or 10010000 and 10010010, each 1 indicating a element boundary; and the method further comprises processing or compressing digital or analog input signals such as audio and/or video into units of information.

16. A method comprising:
encoding an information unit;
variably selecting one out of a set of fixed linking sequences that each start with a link signal element followed by further signal elements;
forming a recording signal of signal elements, the recording signal containing: the selected linking sequence, a synchronizing pattern, and the encoded information unit;
selecting an addressable location on the track of a record carrier;
scanning the track up to a link position before the selected addressable location; and
recording the recording signal as marks corresponding to the signal elements and starting at the link position, the marks having different run lengths, the marks representing the information unit having run lengths that vary from a minimum run length to a maximum runlength, the pattern of marks representing the synchronizing pattern not occurring in the marks representing the information unit and including a long mark of at least the maximum runlength, the mark representing the link signal element having a run length of at most the minimum runlength, the linking sequences each have a fixed length of 8 channel bits, the set of fixed linking sequences being selected from: a first set including 10100000 and 10100100; and a second set including 10010000 and 10010010; wherein each 1 indicating a mark boundary and the number of 0's between 1's indicating the run length between mark boundaries.

17. A recording device comprising:
encoding means for encoding at least one information unit, and for variably selecting one out of a set of fixed linking sequences that each start with a link signal element followed by further signal elements, and for providing a recording signal of signal elements, the recording signal containing the selected linking sequence, a synchronizing pattern, and the encoded information unit; and
recording means for selecting an addressable location in the track of a record carrier, and for scanning said track up to a link position before the selected addressable location and for recording the recording signal starting at the link position, the marks having different run lengths, the marks representing the information unit having run lengths that vary from a minimum run length to a maximum runlength, the pattern of marks representing the synchronizing pattern not occurring in the marks representing the information unit and including a long mark of at least the maximum runlength, the mark representing the link signal element having a run length of at most the minimum runlength, the linking sequences each have a fixed length of 8 channel bits, the set of fixed linking sequences being selected from: a first set including 10100000 and 10100100; and a second set including 10010000 and 10010010; wherein each 1 indicating a mark boundary and the number of 0's between 1's indicating the run length between mark boundaries.

18. Method of recording information in units on a record carrier having a track for consecutively recording the information units at addressable locations, the information being represented in the track by series of marks of different runlengths between a minimum runlength and a maximum runlength and synchronizing patterns of marks, which patterns do not occur in the series of marks and comprise at least one long mark of at least the maximum length, said method comprising:
  (a) encoding at least one information unit into a modulated signal comprising signal elements corresponding to said marks,
  (b) scanning said track up to a link position before a selected one of said addressable locations, and
  (c) recording the modulated signal from the link position,
  (d) the modulated signal is provided at the begin and/or at the end with a link signal element corresponding to a link mark of at most the minimum runlength,
wherein the link signal element is part of a linking section having a total length substantially less than the length of a frame and sufficiently short to be compatible with CD-R, CD-RW, DVD, and DVD-RW.

19. Device for recording information in units on a record carrier having a track for consecutively recording the information units at addressable locations, the information being represented in the track by series of marks of different runlengths between a minimum runlength and a maximum runlength and synchronizing patterns of marks, which patterns do not occur in the series of marks and comprise at least one long mark of at least the maximum runlength, said device comprising
  encoding means for encoding at least one information unit into a modulated signal comprising signal elements corresponding to said marks, and
  recording means for scanning said track up to a link position before a selected one of said addressable locations and recording the modulated signal from the link position,
  the encoding means are arranged for providing the modulated signal at the begin and/or at the end with a link signal element corresponding to a link mark of at most the minimum runlength,
  wherein the link signal element is part of a linking section having a total length substantially less than the length of a frame and sufficiently short to be compatible with CD-R, CD-RW, DVD, and DVD-RW.

20. A method comprising:
  encoding an information unit;
  forming a recording signal of signal elements, the recording signal containing: a linking signal element, a synchronizing pattern of signal elements, and the encoded information unit;
  selecting an addressable location on the track of a record carrier;
  scanning the track up to a link position before the selected addressable location; and
  recording the recording signal as marks corresponding to the signal elements and starting at the link position, the marks having different run lengths, the marks representing the information unit having run lengths that vary from a minimum run length to a maximum runlength, the pattern of marks representing the synchronizing pattern not occurring in the marks representing the information unit and including a long mark of at least the maximum runlength, the mark representing the link signal element having a run length of at most the minimum runlength,
  wherein the link signal element is part of a linking section having a total length substantially less than the length of a frame and sufficiently short to be compatible with CD-R, CD-RW, DVD, and DVD-RW.

21. A recording device comprising:
  encoding means for encoding at least one information unit, and for variably selecting one out of a set of fixed linking sequences that each start with a link signal element followed by further signal elements, and for providing a recording signal of signal elements, the recording signal containing the selected linking sequence, a synchronizing pattern, and the encoded information unit; and
  recording means for selecting an addressable location in the track of a record carrier, and for scanning said track up to a link position before the selected addressable location and for recording the recording signal starting at the link position, the marks having different run lengths, the marks representing the information unit having run lengths that vary from a minimum run length to a maximum runlength, the pattern of marks representing the synchronizing pattern not occurring in the marks representing the information unit and including a long mark of at least the maximum runlength, the mark representing the link signal element having a run length of at most the minimum runlength,
  wherein the link signal element is part of a linking section having a total length substantially less than the length of a frame and sufficiently short to be compatible with CD-R, CD-RW, DVD, and DVD-RW.

22. Method of recording information in units on a record carrier having a track for consecutively recording the information units at addressable locations, the information being represented in the track by series of marks of different runlengths between a minimum runlength and a maximum runlength and synchronizing patterns of marks, which patterns do not occur in the series of marks and comprise at least one long mark of at least the maximum runlength, said method comprising:
  (a) encoding at least one information unit into a modulated signal comprising signal elements corresponding to said marks,
  (b) scanning said track up to a link position before a selected one of said addressable locations, and
  (c) recording the modulated signal from the link position,
  (d) the modulated signal is provided at the begin and/or at the end with a link signal element corresponding to a link mark of at most the minimum runlength,
wherein the information units are organized into ECC units and the method further comprises recording the link signal element at the end of the last C1 code word of the previous ECC unit.

23. The method of claim 22, wherein the link position is after byte 178 of the last C1 code word.

24. The method of claim 22, further comprising introducing a small random shift of the link position to improve direct overwrite cycles.

25. Method of recording information in units on a record carrier having a track for consecutively recording the information units at addressable locations, the information being represented in the track by series of marks of different runlengths between a minimum runlength and a maximum runlength and synchronizing patterns of marks, which patterns do not occur in the series of marks and comprise at least one long mark of at least the maximum runlength, said method comprising:
  (a) encoding at least one information unit into a modulated signal comprising signal elements corresponding to said marks,
  (b) scanning said track up to a link position before a selected one of said addressable locations, and (c) recording the modulated signal from the link position,
(d) the modulated signal is provided at the begin and/or at the end with a link signal element corresponding to a link mark of at most the minimum runlength,
wherein the link position is placed 8 channel bits before a boundary between ECC blocks.

26. The method of claim 18, wherein the link mark is selected from a predetermined set of linking sequences that each start with a link mark followed by a predefined but different number of mark boundaries.

* * * * *